O. A. Howe.
Horseshoe.
No. 1,790. Reissued Oct. 11, 1864.
Fig. 1
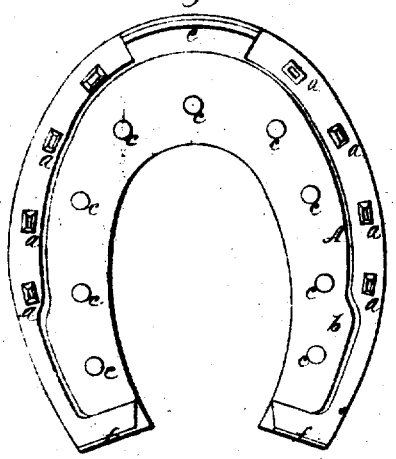
Fig. 2
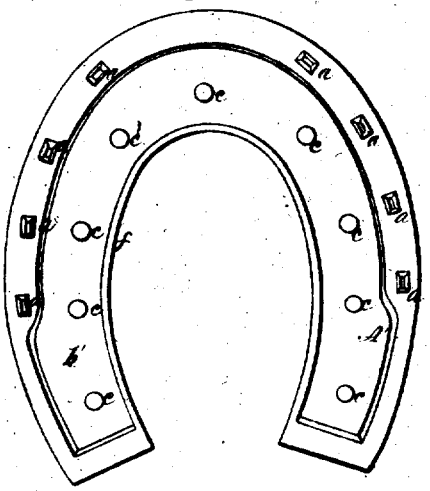
Fig. 3
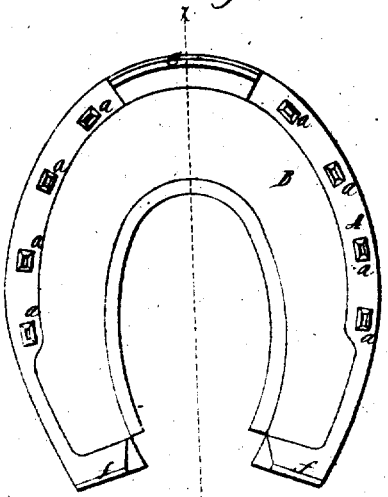
Fig. 4
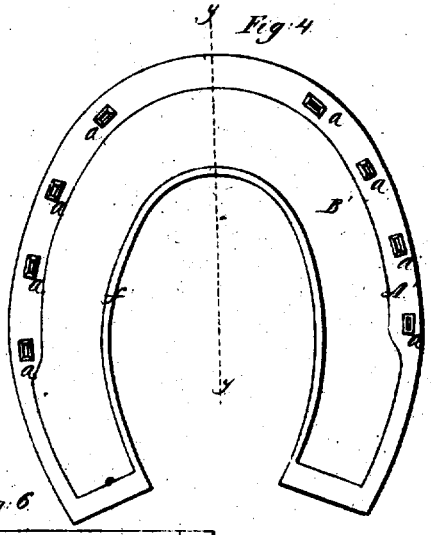
Fig. 6
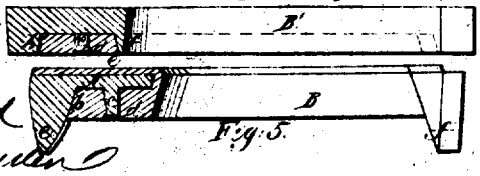
Fig. 5.
Witnesses:
Geo. W. Reed
Robt. H. Lowden
Inventor.
O. A. Howe

UNITED STATES PATENT OFFICE.

O. A. HOWE, OF NEW YORK, N. Y.

IMPROVEMENT IN HORSESHOES.

Specification forming part of Letters Patent No. 30,926, dated September 15, 1863; Reissue No. 1,790, dated October 11, 1864.

*To all whom it may concern:*

Be it known that I, O. A. HOWE, of the city, county, and State of New York, have invented an Improved Horseshoe; and I do hereby declare that the following is a full, clear, and exact description of the same, reference being had to the accompanying drawings, making a part of this specification, in which—

Figures 1 and 2 are face views of my invention with the india-rubber omitted or not applied to it; Figs. 3 and 4, face views of the same with the india-rubber applied to it; Figs. 5 and 6, sections of Figs. 3 and 4, taken, respectively, in the lines *x x*, *y y*.

Similar letters of reference indicate corresponding parts in the several figures.

This invention consists in applying vulcanized india-rubber or other suitable material to a horseshoe in such a manner that a firm connection of the rubber or other material to the shoe is obtained and the latter prevented from clogging up with snow, or "balling," as it is technically termed, and also prevented from slipping, while the feet are prevented from being subjected to the jars and concussions which are the fruitful source of disease in horses, especially if driven over pavements in cities.

To enable those skilled in the art to fully understand and construct the invention, I will proceed to describe it.

A, Figs. 1, 3, and 5, represents the metallic portion of the improvement, which is of the same shape as an ordinary horseshoe, and is provided, as usual, with holes *a*, for the nails which secure the shoes to the feet to pass through. The metallic portion A of the shoe is formed with a recess, *b*, which extends all around it on its face or under side, and in this recess there are a number of pendent projections, *c*, which are provided with heads *d*, as shown clearly in Figs. 5 and 6. The metallic part A may be provided with a toe and heel calk, *e f f*, as shown in Figs. 1, 3, and 5, or they may have a smooth face, as shown in Figs. 2, 4, and 6.

B represents a piece of vulcanized india-rubber, which is cast around the shoe by placing the same in a proper mold. This rubber B is within the recess *b*, and extends down so as to be flush with the face of the shoe, and projects over the top or upper side of the part A, and extends all around to the outer edge of the same in a quite thin layer, as designated by *e* in Fig. 5. The pendent projections *c* retain or hold the rubber firmly to the part A of the shoe in consequence of the heads or enlarged lower ends *d* of the projections *c*. The part A′ (shown in Figs. 2, 4, and 6) does not have its rubber B′ extend over the top or upper surface of the part A, and the part A′ has a flange, *f′*, projecting down all around its inner edge, so as to form a groove, *b′*, to receive the rubber B′. By having the india-rubber applied to the shoe in this way the horse is effectually prevented from slipping, and also prevented from balling in winter while snow is on the ground. The rubber also preserves the feet from jars and concussions, which are the cause of numerous evils or troubles pertaining to the feet.

The invention has been practically tested and found to answer an admirable purpose.

I would remark that other material besides india-rubber may be employed, and that in many cases the groove in the shoe would become filled with earth and packed firmly down so as to prevent slipping.

I claim as new and desire to secure by Letters Patent—

A horseshoe provided at its under or face side with a groove having pendent projections or their equivalent within it, to hold a filling of india-rubber or any other suitable material, substantially as herein set forth.

O. A. HOWE.

Witnesses:
WM. T. MCNAMARA,
J. P. HALL.